(12) United States Patent
Okamoto et al.

(10) Patent No.: US 7,762,099 B2
(45) Date of Patent: Jul. 27, 2010

(54) REFRIGERATION APPARATUS

(75) Inventors: Masakazu Okamoto, Osaka (JP);
Katsumi Sakitani, Osaka (JP); Michio Moriwaki, Osaka (JP); Yume Inokuchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 209 days.

(21) Appl. No.: 11/886,231

(22) PCT Filed: Mar. 3, 2006

(86) PCT No.: PCT/JP2006/304078

§ 371 (c)(1),
(2), (4) Date: Sep. 13, 2007

(87) PCT Pub. No.: WO2006/098165

PCT Pub. Date: Sep. 21, 2006

(65) Prior Publication Data

US 2008/0163642 A1    Jul. 10, 2008

(30) Foreign Application Priority Data

Mar. 15, 2005  (JP)  .................... 2005-073671

(51) Int. Cl.
*F25B 1/06* (2006.01)
*F25B 1/10* (2006.01)
*F25D 9/00* (2006.01)

(52) U.S. Cl. .............................. 62/402; 62/191; 62/401; 62/403; 62/500; 62/510

(58) Field of Classification Search ................... 62/191, 62/401, 402, 403, 500, 510
See application file for complete search history.

(56) References Cited

U.S. PATENT DOCUMENTS

| | | | | | |
|---|---|---|---|---|---|
| 3,668,884 | A | * | 6/1972 | Nebgen | 62/228.5 |
| 4,347,714 | A | * | 9/1982 | Kinsell et al. | 62/402 |
| 6,397,623 | B1 | * | 6/2002 | Takachi | 62/403 |
| 2004/0118138 | A1 | * | 6/2004 | Nakatani et al. | 62/197 |

FOREIGN PATENT DOCUMENTS

| | | |
|---|---|---|
| JP | 63-60300 B2 | 11/1988 |
| JP | 2001-107881 A | 4/2001 |
| JP | 2004-138333 A | 5/2004 |

* cited by examiner

*Primary Examiner*—Thomas E. Denion
*Assistant Examiner*—Michael Carton
(74) *Attorney, Agent, or Firm*—Birch, Stewart, Kolasch & Birch, LLP

(57) ABSTRACT

A first and a second expansion and compression machine (30, 40) having different volume ratios (Vc/Ve) are connected in parallel to a refrigerant circuit (10) of a refrigeration apparatus. Expanders (31, 41) of the expansion and compression machines (30, 40) are connected in parallel. Compressors (32, 42) of the expansion and compression machines (30, 40) are also connected in parallel. Upon variation in the operating condition of the refrigeration apparatus, the ratio of rotation speed between the expansion and compression machines (30, 40) is controlled by a controller (60). This, as a result, allows the refrigeration apparatus to operate at a COP close to an ideal condition.

14 Claims, 9 Drawing Sheets

US 7,762,099 B2

REFRIGERATION APPARATUS

TECHNICAL FIELD

This invention relates to a refrigeration apparatus which is provided with a fluid machine which is configured by connecting together an expander and a compressor via a rotation shaft.

BACKGROUND ART

In the past, refrigeration apparatuses have been known which are provided with a refrigerant circuit through which refrigerant is circulated to thereby perform a refrigeration cycle. This type of refrigeration apparatus finds wide utility in the field of air conditioners or the like.

For example, JP-A-2001-107881 (hereinafter referred to as the patent document) shows a refrigeration apparatus in which a positive displacement fluid machine is connected in the refrigerant circuit. This fluid machine is configured by mechanically connecting together an expander and a compressor via a rotation shaft. In addition, an indoor heat exchanger and an outdoor heat exchanger are connected in the refrigerant circuit.

In the refrigeration apparatus, the refrigerant in the refrigerant circuit is circulated to thereby perform a refrigeration cycle, whereby cooling or heating of the room is accomplished. More specifically, for example, during the heating operation, the refrigerant which has been compressed in the compressor of the fluid machine flows through the indoor heat exchanger. In the indoor heat exchanger, the refrigerant gives up heat to the indoor air. As a result, heating of the room is accomplished. The refrigerant which has given up heat in the indoor heat exchanger flows into the expander of the fluid machine. The refrigerant expands in the expander, wherein internal energy produced upon expansion of the refrigerant in the expander is converted through the rotation shaft into power to rotationally drive the compressor. The refrigerant which has expanded in the expander then flows through the outdoor heat exchanger. In the outdoor heat exchanger, the refrigerant extracts heat from the outdoor air and is evaporated.

As described above, in the refrigeration apparatus of the patent document, internal energy produced upon expansion of the refrigerant in the expander is utilized as power to drive the compressor. The refrigeration apparatus of the patent document tries to realize a refrigeration cycle having a high energy efficiency (i.e., a refrigeration cycle at a high COP) by reduction in the power load of the compressor.

DISCLOSURE OF THE INVENTION

Problems which the Invention Seeks to Overcome

Meanwhile, in the case of application of a refrigeration apparatus of the type as disclosed in the patent document to an air conditioner or the like, this requires control of the capability of the refrigeration apparatus in response to variation in the operating condition of the air conditioner. For such a variation in the operating condition of the refrigeration apparatus, it is a general practice that the number of rotations of the compressor is changed to thereby control the volume of the compressor.

However, the compressor of the above-described fluid machine is limited in the range of control of its volume. This gives rise to the possibility that, in the case where the actually required volume of the compressor falls within a range in excess of the volume control range, the capability of the refrigeration apparatus may become excessive or insufficient. Especially, for the case of a so-called "indoor multi-type air conditioner" in which a plurality of indoor heat exchangers are disposed in the refrigerant circuit, the range of control of the actually required volume of the compressor becomes further wider. Therefore, it becomes more difficult to make the capability of the refrigeration apparatus responsive to variation in the operating condition of the refrigeration apparatus.

With these problems in mind, the present invention was devised. Accordingly, a general object of the present invention is to expand, in a refrigeration apparatus which is provided with a fluid machine which is configured by coupling together an expander and a compressor via a rotation shaft, the capability range of the refrigeration apparatus.

Means for Overcoming the Problems

The present invention provides, as a first aspect, a refrigeration apparatus comprising a refrigerant circuit (10) in which a refrigeration cycle is performed by circulation of refrigerant therethrough and a fluid machine (30, 40) connected to the refrigerant circuit (10), the fluid machine (30, 40) including an expander (31, 41), a compressor (32, 42), and a rotation shaft (33, 43) for coupling together the expander (31, 41) and the compressor (32, 42). In the refrigeration apparatus of the first aspect, (a) a plurality of the fluid machines (30, 40) are connected to the refrigerant circuit (10), (b) the expanders (31, 41) of the fluid machines (30, 40) are mutually connected in parallel, and (c) the compressors (32, 42) of the fluid machines (30, 40) are also mutually connected in parallel.

In the first aspect of the present invention, the plural fluid machines (30, 40) are disposed in the refrigerant circuit (10). Each of the fluid machines (30, 40) is configured by coupling together the compressor (32, 42) and the expander (31, 41) via the rotation shaft (33, 43).

The compressors (32, 42) are mutually connected in parallel in the refrigerant circuit (10). Consequently, if all of the fluid machines (30, 40) are placed in operation, the flow of low-pressure refrigerant is diverged, drawn into the compressors (32, 42), and compressed by the compressors (32, 42).

Likewise, the expanders (31, 41) are mutually connected in parallel in the refrigerant circuit (10). Consequently, if all of the fluid machines (30, 40) are placed in operation, the flow of high-pressure refrigerant is diverged, drawn into the expanders (31, 41), and expanded by the expanders (31, 41). As a result, internal energy produced upon expansion of the refrigerant in each of the expanders (31, 41) is converted into power to rotationally drive its associated compressor (32, 42).

The present invention provides, as a second aspect according to the first aspect, a refrigeration apparatus which is characterized in that, where the suction volume of refrigerant drawn into the compressor (32, 42) per one rotation of the rotation shaft (33, 43) of each of the plurality of the fluid machines (30, 40) is expressed by Vc and the inflow volume of refrigerant flowing into the expander (31, 41) per one rotation of the rotation shaft (33, 43) of each of the plurality of the fluid machines (30, 40) is expressed by Ve, the plurality of the fluid machines (30, 40) are configured such that they differ from each other in the volume ratio, Vc/Ve, of the suction volume Vc to the inflow volume Ve.

In the second aspect of the present invention, the volume ratio Vc/Ve (i.e., the ratio of the suction volume Vc to the inflow volume Ve) of each of the fluid machines (30, 40) is set at a different value from the other of the fluid machines (30, 40). Description will be concretely made regarding the volume ratio Vc/Ve with reference to FIG. 9.

For the case of a fluid machine configured by connecting together an expander and a compressor, the volume ratio Vc/Ve is designed such that it accomplishes a maximum COP. Here, the volume ratio Vc/Ve is calculated using a relational expression of Vc/Ve=de/dc, where dc and de are the compressor suction refrigerant density and the expander inflow refrigerant density, respectively, at the design operating condition. Note here that this density ratio de/dc is determined in response to the type of refrigerant used in the refrigeration apparatus, to the design evaporating temperature thereof, or to other parameter. In the example of FIG. 9, the density ratio de/dc is determined using, as a design point, a design outdoor temperature of 0° C. (a design evaporation temperature of about minus 5° C.) during the heating operation of an air conditioner to which the refrigeration apparatus is applied. Based on the determined density ratio de/dc, the volume ratio Vc/Ve capable of accomplishing a maximum COP (point A) under the condition where the outdoor temperature is at 0° C. is designed.

However, in fact, the outdoor temperature varies considerably during the heating operation of the air conditioner. Consequently, for example, as shown in FIG. 9, the actual compressor suction refrigerant density dc diminishes when the outdoor temperature reaches a temperature of minus 10° C. (when the evaporation temperature reaches a temperature of about minus 15° C.). Consequently, the actual density ratio de/dc becomes greater than the volume ratio Vc/Ve, and the actually obtained COP (point B') falls below the ideal COP (point B) at an outdoor temperature of minus 10° C.

In addition, for example, when the outdoor temperature reaches a temperature of 10° C. (when the evaporation temperature reaches a temperature of about 5° C.), the actual compressor suction refrigerant density dc increases. Consequently, the actual density ratio de/dc becomes smaller than the volume ratio Vc/Ve, and the actually obtained COP (point C') falls below the ideal COP (point C) at an outdoor temperature of 10° C.

Contrary to the above, in the present invention, the refrigeration apparatus is provided with the plural fluid machines (30, 40), as described above. In addition, the volume ratio Vc/Ve of each of the fluid machines (30, 40) is designed to have a different value from the other of the fluid machines (30, 40). In other words, the refrigeration apparatus is provided with the plural fluid machines (30, 40) which have different design points each capable of accomplishing a respective ideal COP.

That is, for example, as shown in FIG. 10, a first and a second fluid machine are disposed in the refrigerant circuit, wherein the first fluid machine provides an ideal COP (point B in FIG. 10) at an outdoor temperature of minus 10° C. (at an evaporation temperature of about minus 15° C.) while on the other hand the second fluid machine provides an ideal COP (point C in FIG. 10) at an outdoor temperature of 10° C. (at an evaporation temperature of about 5° C.), in other words, it becomes possible to provide two different design points each capable of accomplishing a respective ideal COP. Accordingly, for example, under the operating condition where the outdoor temperature is at minus 10° C., it is possible to obtain an ideal COP by causing only the first fluid machine to operate. On the other hand, for example, under the operating condition where the outdoor temperature is at 10° C., it is possible to obtain an ideal COP by causing only the second fluid machine to operate.

The present invention provides, as a third aspect according to the second aspect, a refrigeration apparatus which is characterized in that a control means (60) is provided which provides individual control of the rotation speed of each of the rotation shafts (33, 43) of the plurality of the fluid machines (30, 40).

In the third aspect of the present invention, the control means (60) provides individual control of the rotation speed of each of the plural fluid machines (30, 40) having different values for the volume ratio Vc/Ve. By such individual control of the rotation speed of each of the fluid machines (30, 40), it becomes possible to provide an ideal COP even when the operating condition is varied between the design points.

Concrete description will be made regarding the above. For example, in the example shown in FIG. 10, the first and second fluid machines are provided, the design point of the former of which is at an outdoor temperature of minus 10° C. and the design point of the latter of which is at an outdoor temperature of 10° C. As can be obviously seen from FIG. 10, the fluid machines have different COP characteristics obtained for actual outdoor temperatures. Therefore, if, taking into account these COP characteristics with respect to the fluid machines, the ratio of rotation speed between the fluid machines is controlled in response to the outdoor temperature, this makes it possible to constantly obtain ideal COP's (indicated by curved line B-C in FIG. 10) within the range between the first design point (outdoor temperature: minus 10° C.) and the second design point (outdoor temperature: 10° C.).

The present invention provides, as a fourth aspect according to the second aspect, a refrigeration apparatus which is characterized in that the plurality of the fluid machines (30, 40) are configured such that they have the same value for the suction volume Vc.

In the fourth aspect of the present invention, with respect to the plural fluid machines (30, 40), the expanders (31, 41) are so designed as to have different values for the inflow volume Ve while on the other hand the compressors (32, 42) are so designed as to have the same value for the suction volume Vc. As a result of such design, the compressors (32, 42) of the fluid machines (30, 40) are allowed to have the same specification.

The present invention provides, as a fifth aspect according to the second aspect, a refrigeration apparatus which is characterized in that the refrigerant circuit (10) is provided with an expansion valve (50) which is disposed on the inflow side of the expander (41) of the one of the plural fluid machines (30, 40) that has the largest value for the volume ratio Vc/Ve thereamong.

In the fifth aspect of the present invention, the expansion valve (50) is disposed on the inflow side of the expander (41) of the fluid machine (40) having the largest value for the volume ratio Vc/Ve. Consequently, by reducing the degree of opening of the expansion valve (50), it becomes possible to reduce the inflow refrigerant density de with respect to the expander (41) of the fluid machine (40).

The present invention provides, as a sixth aspect according to any one of the first to fifth aspects, a refrigeration apparatus which is characterized in that the refrigerant in the refrigerant circuit is $CO_2$.

In the sixth aspect of the present invention, the refrigerant of $CO_2$ circulates through the refrigerant circuit (10) to thereby perform a refrigeration cycle. Stated another way, a so-called supercritical cycle in which the difference between high and low pressures of the refrigerant is great is performed.

Advantageous Effects of the Invention

In accordance with the present invention, the plural fluid machines (30, 40) are disposed in the refrigerant circuit (10), wherein each of the compressors (32, 42) performs a refrigerant compression stroke while on the other hand each of the expanders (31, 41) performs a refrigerant expansion stroke. Consequently, by controlling the volume of each of the compressors (32, 42), it becomes possible to expand the range of control of the overall compressor volume in the refrigeration apparatus (i.e., the capability range of the refrigeration apparatus).

In addition, the expanders (31, 41) are connected to the compressors (32, 42), respectively, thereby making it possible to recover internal energy produced upon expansion of the refrigerant in the expanders (31, 41) as power to rotate the compressors (32, 42). This therefore makes it possible to improve the COP of the refrigeration apparatus.

In accordance with the second aspect of the present invention, the plural fluid machines (30, 40) are designed such that they have different values for the volume ratio Vc/Ve. In other words, the refrigeration apparatus of the present invention is provided with the plural fluid machines (30, 40) having different design points for obtaining ideal COP's. Consequently, in the case where the actual density ratio de/dc varies with variation in the operating condition such as outdoor temperature, it is possible to obtain an ideal COP by causing a fluid machine having a design point close to the operating condition to operate, thereby making it possible to obtain an ideal COP.

Meanwhile, there are known techniques for causing the actual density ratio de/dc to approximate to the volume ratio Vc/Ve, such as a means for pre-expanding the refrigerant flowing into the expander and a means for bypassing the refrigerant flowing into the expander to the outflow side thereof.

In the former conventional means, in the case where the actual density ratio de/dc becomes greater than the volume ratio Vc/Ve, the refrigerant flowing into the expander is pre-expanded by the expansion value in order that the inflow refrigerant density de of the expander is reduced. However, the problem with this conventional means is that the refrigerant is expanded before entry into the expander, as a result of which the amount of power produced by expansion of the refrigerant and recovered to the fluid machine is reduced.

In the latter conventional means, in the case where the actual density ratio de/dc becomes smaller than the volume ratio Vc/Ve, the inflow refrigerant unprocessable by the expander is bypassed to the outflow side of the expander. However, the problem with this conventional means is that the recovery power of the fluid machine is reduced correspondingly to the flow rate of the refrigerant made to bypass the expander.

Contrary to the above, in the present invention, the refrigerant flowing into the expander is not subjected to pre-expansion and all the refrigerant flows into the expander. Accordingly, the recovery power of the fluid machines (30, 40) is more enhanced than the aforesaid known pre-expansion and bypass means.

Especially, in accordance with the third aspect of the present invention, the rotational speed of each of the plural fluid machines (30, 40) is individually controlled. This therefore makes it possible to constantly obtain ideal COP's within the range between the design points of the fluid machines (30, 40) by controlling the ratio of rotation speed between the fluid machines (30, 40) in response to the operating condition (see, for example, FIG. 10).

In accordance with the fourth aspect of the present invention, the compressors (32, 42) of the plural fluid machines (30, 40) have the same value for the suction volume Vc, thereby making it possible to design the compressors (32, 42) using the same specification. Generally, compressors which are disposed in this type of fluid machine have a greater cylinder volume than expanders. Therefore, by the arrangement that the compressors (32, 42) have the same specification, it becomes possible to effectively cut down the costs of the fluid machines (30, 40).

In accordance with the fifth aspect of the present invention, the expansion valve (50) is disposed on the inflow side of the second fluid machine (40), whereby it becomes possible to reduce the inflow refrigerant density de with respect to the expander (41) of the second fluid machine (40) by reducing the degree of opening of the expansion valve (50).

Meanwhile, in the case where the actual density ratio de/dc becomes relatively great, correspondingly to this, it is conceivable that only the fluid machine (40) having the largest value for the volume ratio Vc/Ve is made to operate. However, in the case where the actual density ratio de/dc still exceeds the volume ratio Vc/Ve even after operation of the fluid machine (40), it becomes impossible to obtain an ideal COP.

Contrary to the above, it is arranged in the present invention such that the expansion valve (50) serving as the aforesaid pre-expansion means is disposed on the inflow side of the expander of the fluid machine (40) having the largest volume ratio. As a result of such arrangement, in the case where only the fluid machine (40) is placed in operation and, in addition, the actual density ratio de/dc exceeds the volume ratio Vc/Ve of the fluid machine (40), the expansion valve (50) is placed in the open state to reduce the inflow refrigerant density de with respect to the expander (41) of the fluid machine (40), thereby causing the actual density ratio de/dc to approximate to that volume ratio Vc/Ve. Accordingly, even under such conditions, it is possible to obtain an ideal COP.

In accordance with the sixth aspect of the present invention, $CO_2$ is used as a refrigerant, whereby it becomes possible to perform a so-called supercritical cycle in the refrigerant circuit (10). This arrangement makes it possible to increase the difference between refrigerant high and low pressures. Accordingly, it is possible to increase the expansion differential pressure of the refrigerant expanded in the expanders (31, 41), and the recovery power of the fluid machines (30, 40) is further enhanced.

REFERENCE NUMERALS IN THE DRAWINGS

1: air conditioner
10: refrigerant circuit
30: first expansion and compression machine (first fluid machine)
31: first expander (expander)
32: first compressor (compressor)
33: first rotation shaft (rotation shaft)
40: second expansion and compression machine (second fluid machine)
41: second expander (expander)
42: second compressor (compressor)
43: second rotation shaft (rotation shaft)
50: pre-expansion valve (expansion valve)
60: controller

BEST EMBODIMENT MODE FOR CARRYING OUT THE INVENTION

In the following, preferred embodiments of the present invention will be described in detail with reference to the accompanying drawings.

First Embodiment of the Invention

Description will be made regarding a refrigeration apparatus according to a first embodiment of the present invention. The refrigeration apparatus of the first embodiment is applied to an air conditioner (1). The air conditioner (1) is configured such that it is selectively placed in an indoor cooling mode of operation or in an indoor heating mode of operation.

Basic Configuration of Air Conditioner

Figure 1:
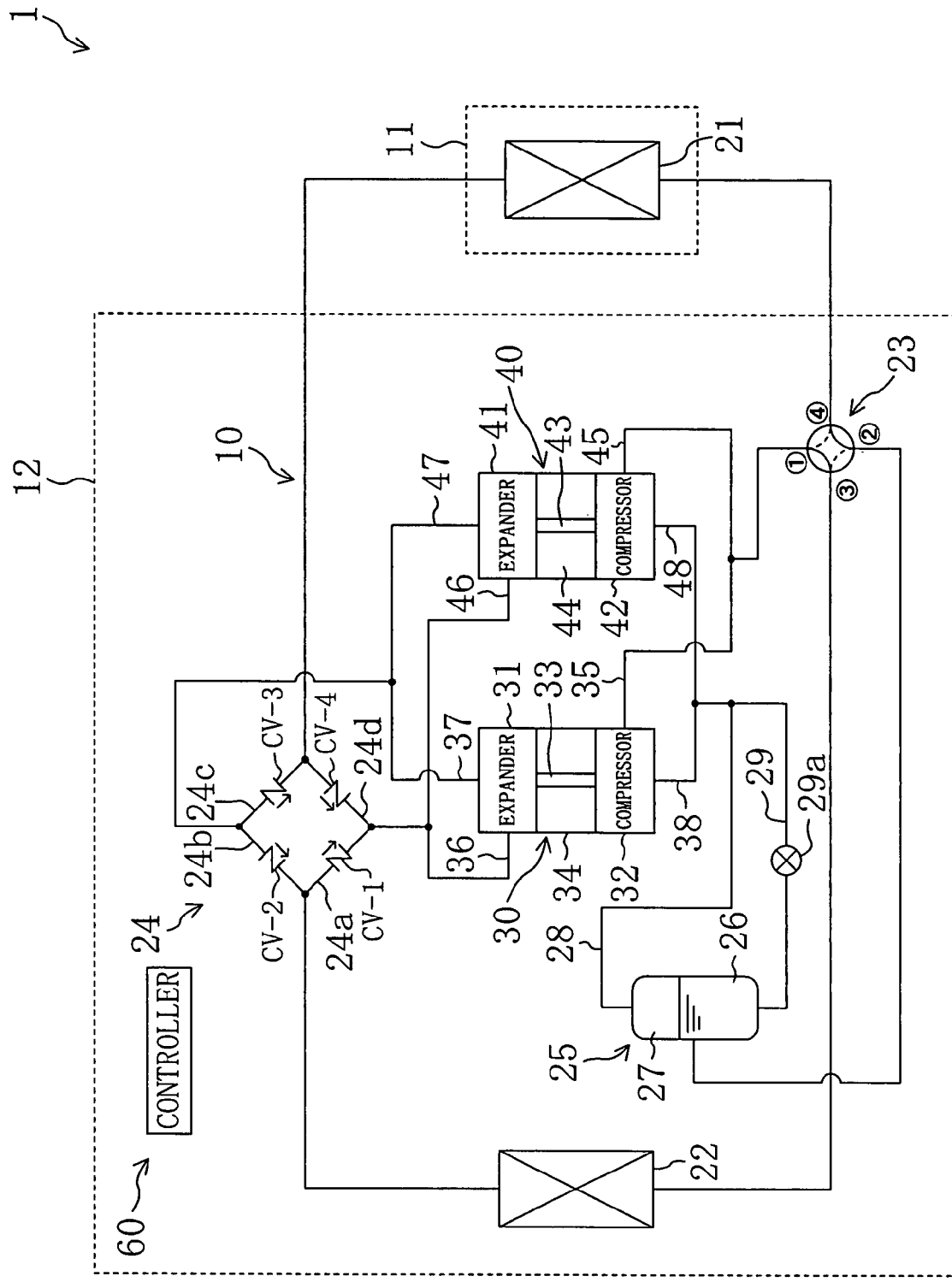
FIG. 1 is a schematic circuit diagram of an air conditioner according to a first embodiment of the present invention.

As shown in FIG. 1, the air conditioner (1) includes a refrigerant circuit (10) in which a refrigeration cycle is performed as the refrigerant circulates therethrough. The refrigerant circuit (10) is charged with carbon dioxide ($CO_2$) which serves as a refrigerant. In addition, the air conditioner (1) has an indoor unit (11) which is installed indoors and an outdoor unit (12) which is installed outdoors. And, the indoor unit (11) and the outdoor unit (12) are coupled together by two interconnecting piping lines, thereby forming the refrigerant circuit (10).

An indoor heat exchanger (21), two expansion and compression machines (30, 40), an outdoor heat exchanger (22), a four-way switching valve (23), a bridge circuit (24), a gas-liquid separator (25) and so on are connected to the refrigerant circuit (10).

The indoor and outdoor heat exchangers (21, 22) are fin and tube heat exchangers of the so-called cross fin type. The indoor heat exchanger (21) is disposed in the indoor unit (11). The indoor heat exchanger (21) is supplied with indoor air by a fan (not shown). And, in the indoor heat exchanger (21), heat exchange takes place between the indoor air and refrigerant. The outdoor heat exchanger (22) is disposed in the outdoor unit (12). The outdoor heat exchanger (22) is supplied with outdoor air by a fan (not shown). And, in the outdoor heat exchanger (22), heat exchange takes place between the outdoor air and refrigerant.

The expansion and compression machines (30, 40) constitute a first and a second fluid machine, respectively. The first and second fluid machines are connected in parallel to the refrigerant circuit (10). The expansion and compression machines (30, 40) are each formed by a positive displacement fluid machine having a respective inherent cylinder volume. In addition, The expansion and compression machines (30, 40) are each formed by a so-called inverter type fluid machine the rotation speed of which is variable.

The first expansion and compression machine (30) has a first expander (31), a first compressor (32), and a first rotation shaft (33). The first expander (31) and the first compressor (32) are coupled together by the first rotation shaft (33). In addition, a first motor (34) for rotationally driving the first rotation shaft (33) is arranged at the outer periphery of the first rotation shaft (33). Likewise, the second expansion and compression machine (40) has a second expander (41), a second compressor (42), and a second rotation shaft (43). The second expander (41) and the second compressor (42) are coupled together by the second rotation shaft (43). In addition, a second motor (44) for rotationally driving the second rotation shaft (43) is arranged at the outer periphery of the second rotation shaft (43).

The four-way switching valve (23) has a first to a fourth port. The first port of the four-way switching valve (23) is connected through a branch pipe to discharge pipes (35, 45) of the first and second compressors (32, 42). The second port of the four-way switching valve (23) is connected to the inflow side of the gas-liquid separator (25). The third port of the four-way switching valve (23) is connected to one end of the outdoor heat exchanger (22). The fourth port of the four-way switching valve (23) is connected to one end of the indoor heat exchanger (21).

The four-way switching valve (23) is switchable between a first state (indicated by solid line in FIG. 1) in which the first and third ports fluidly communicate with each other while simultaneously the second and fourth ports fluidly communicate with each other and a second state (indicated by broken line in FIG. 1) in which the first and fourth ports fluidly communicate with each other while simultaneously the second and third ports fluidly communicate with each other.

The bridge circuit (24) includes a first to a fourth piping line (24a, 24b, 24c, 24d) which are in bridge connection. The inflow side of the first piping line (24a) is connected to the other end of the outdoor heat exchanger (22) and the outflow side thereof is connected through two branch pipes to inflow pipes (36, 46) of the first and second expanders (31, 41). The inflow side of the second piping line (24b) is connected through a branch pipe to outflow pipes (37, 47) of the first and second expanders (31, 41) and the outflow side thereof is connected to the inflow side of the first piping line (24a). The inflow side of the third piping line (24c) is connected to the inflow side of the second piping line (24b) and the outflow side thereof is connected to the other end of the indoor heat exchanger (21). The inflow side of the fourth piping line (24d) is connected to the outflow side of the third piping line (24c) and the outflow side thereof is connected to the outflow side of the first piping line (24a).

In addition, the bridge circuit (24) includes a first to a fourth check valve (CV1, CV2, CV3, CV4) corresponding to the four piping lines (24a, 24b, 24c, 24d), respectively. Each of the check valves (CV1, CV2, CV3, CV4) permits the refrigerant to flow in one direction only from the inflow to the outflow side of its associated one of the piping lines (24a, 24b, 24c, 24d) (in the direction indicated by arrow in FIG. 1).

The gas-liquid separator (25) is formed by a closed container which is configured such that it separates the refrigerant into a liquid refrigerant and a gas refrigerant and stores them. Defined within the gas-liquid separator (25) are a liquid storage part (26) and a gas storage part (27). The liquid storage part (26) is formed in the lower part of the gas-liquid separator (25). The liquid storage part (26) stores the liquid refrigerant after separation by the gas-liquid separator (25). On the other hand, the gas storage part (27) is formed in the upper part of the gas-liquid separator (25). The gas storage part (27) stores the gas liquid after separation by the gas-liquid separator (25).

Connected to the gas storage part (27) of the gas-liquid separator (25) is one end of a gas introduction pipe (28). The other end of the gas introduction pipe (28) is connected through two branch pipes to suction pipes (38, 48) of the compressors (32, 42). On the other hand, connected to the liquid storage part (26) of the gas-liquid separator (25) is one end of a liquid introduction pipe (29). The other end of the liquid introduction pipe (29) is connected to the gas introduction pipe (28). In addition, the liquid introduction pipe (29) is provided with a liquid flow rate control valve (29a) capable of control of the degree of opening of the liquid introduction pipe (29).

Volume Ratio of Expansion and Compression Machine

In the expansion and compression machines (30, 40), their expanders (31, 41) and compressors (32, 42) are formed by positive displacement fluid machines. For example, as an example of this positive displacement fluid machine, there are rotary fluid machines and scroll fluid machines. For each of the expansion and compression machines (30, 40), a respective inherent volume ratio Vc/Ve is determined. The Vc/Ve represents the ratio of Vc to Ve, where Vc is the suction volume of each of the compressors (32, 42) (the volume of suction refrigerant drawn into the compressor per one rotation of the rotation shaft of the compressor) and Ve is the inflow volume of each of the expanders (31, 41) (the volume of inflow refrigerant flowing into the expander per one rotation of the rotation shaft of the expander).

Meanwhile, in order to obtain an ideal COP in the expansion and compression machine, the volume ratio Vc/Ve is determined by the expander inflow refrigerant density de and the compressor suction refrigerant density dc in a predetermined design operating condition. In other words, it becomes possible to obtain an ideal COP in the air conditioner (1) by designing the volume ratio of the fluid machine so that Vc/Ve=de/dc is met. Note that the density ratio de/dc is the value which is influenced especially by the evaporation temperature of the refrigerant in the refrigerant circuit. In consideration of this, in the present embodiment, the design evaporation temperature of the air conditioner (1) is used as a reference value to determine the density ratio de/dc and, based on the determined density ratio de/dc, the volume ratio Vc/Ve is designed. At this time, as a feature of the present invention, it is designed such that the expansion and compression machines (30, 40) have different values for the volume ratio Vc/Ve.

Figure 2:
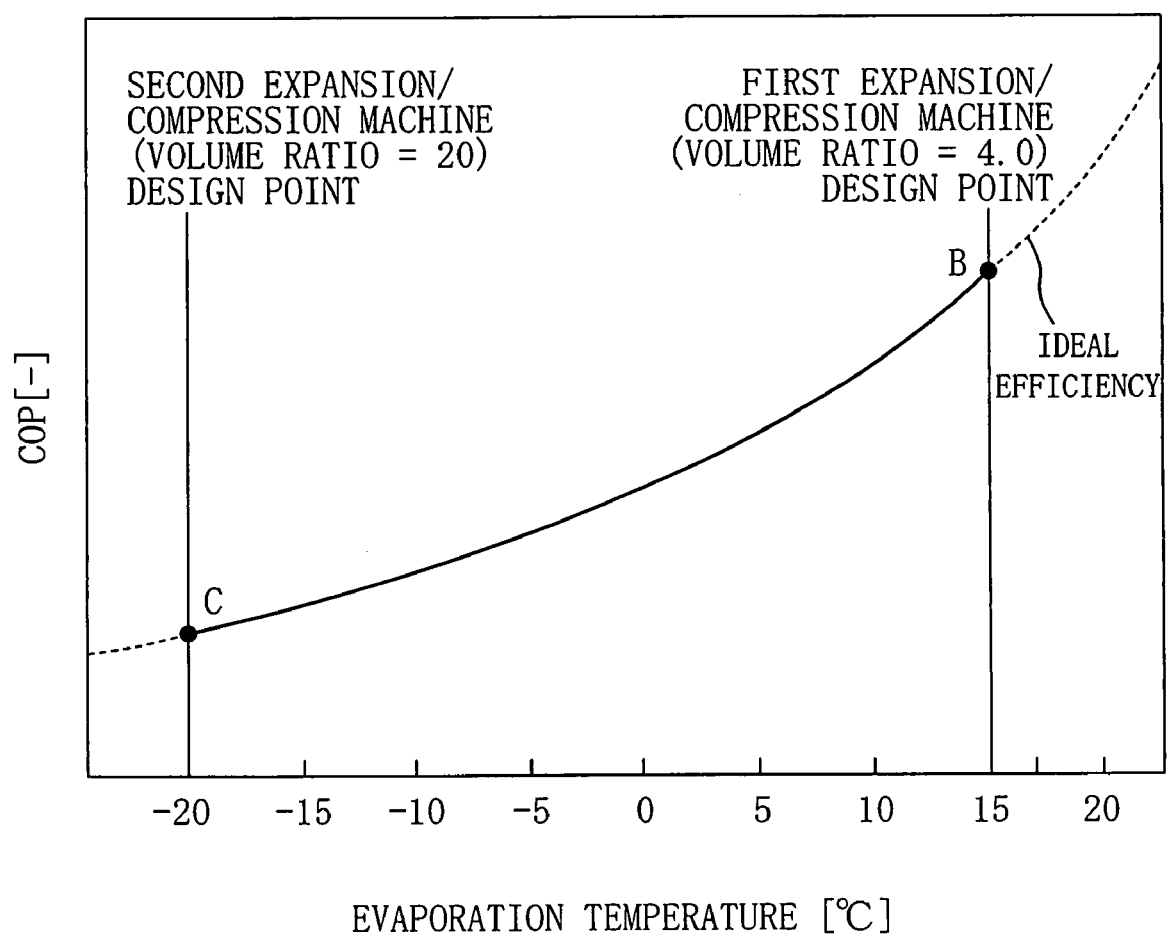
FIG. 2 is a diagram graphically showing a relationship between the evaporation temperature and the COP of the air conditioner of the first embodiment.

As shown in FIG. 2, the design evaporation temperature of the air conditioner (1) is designed to fall within the range not less than minus 20° C. nor more than 15° C., including the operating conditions of the cooling and heating operations. Contrary to this, for the case of the first expansion and compression machine (30), its volume ratio is determined on the basis of a reference temperature of 15° C. which is an upper limit design evaporation temperature, and its concrete volume ratio $Vc_1/Ve_1$ is 4.0. In the first expansion and compression machine (30), the suction volume, $Vc_1$, of the first compressor (32) is about 20 cc and the inflow volume, $Ve_1$, of the first expander (31) is about 5 cc.

On the other hand, for the case of the second expansion and compression machine (40), its volume ratio is determined on the basis of a reference temperature of minus 20° C. which is a lower limit design evaporation temperature, and its concrete volume ratio $Vc_2/Ve_2$ is 20. In the second expansion and compression machine (40), the suction volume, $Vc_2$, of the second compressor (42) is about 20 cc (which is the same as the suction volume, $Vc_1$, of the first compressor (32)), and the inflow volume, $Ve_2$, of the second expander (41) is about 1.33 cc.

Configuration of Controller

As shown in FIG. 1, the air conditioner (1) is provided with a controller (60) as a control means. The controller (60) controls switching operation of the four-way switching valve (23) and start/stop operation of each of the expansion and compression machines (30, 40). Additionally, the refrigerant circuit (10) is provided with either temperature sensors for measurement of outdoor temperatures, refrigerant evaporation temperatures and so on or pressure sensors for measurement of refrigerant low and high pressures (diagrammatical representation of these sensors is omitted). Based on the values detected by the sensors, the controller (60) controls the degree of opening of the liquid flow rate control valve (29a). Furthermore, the controller (60) performs individual control of the rotation speed of each of the expansion and compression machines (30, 40) in response to variation in the operating condition detected based on the detected values of the sensors. More specifically, the controller (60) of the present embodiment performs individual control of the rotation speed of each of the expansion and compression machines (30, 40) in response to the refrigerant evaporation temperature.

Running Operation

Next, description will be made regarding the basic running operation of the air conditioner (1) of the first embodiment.

Cooling Operation

Figure 3:
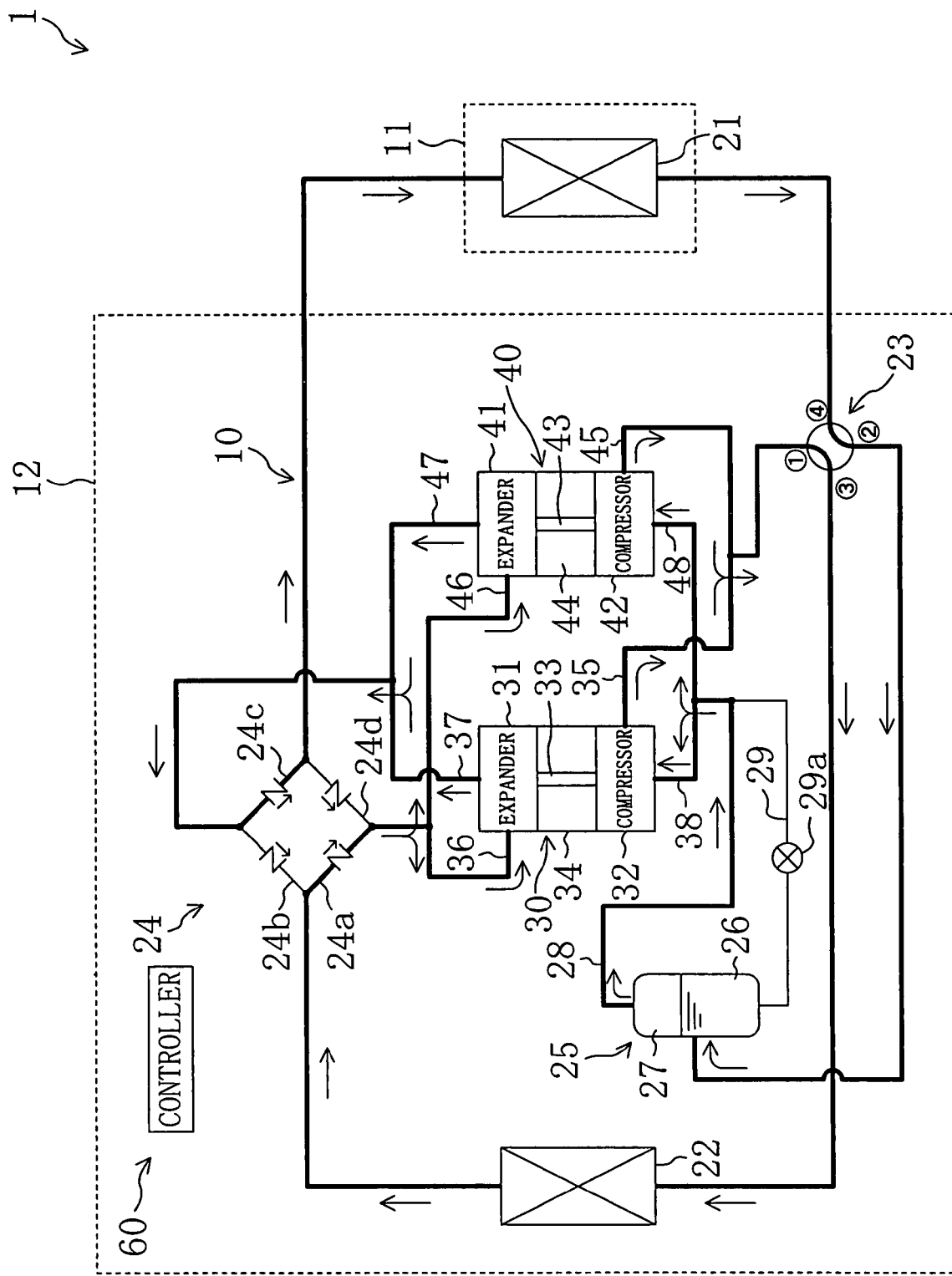
FIG. 3 is a schematic circuit diagram showing the flow of refrigerant during a cooling operation of the air conditioner of the first embodiment.

In the cooling operation of the air conditioner (1), the four-way switching valve (23) changes state to a state as shown in FIG. 3. In addition, each of the expansion and compression machines (30, 40) is placed in operation whereby the refrigeration cycle is performed as the refrigerant circulates through the refrigerant circuit (10). Consequently, the indoor heat exchanger (21) functions as an evaporator while on the other hand the outdoor heat exchanger (22) functions as a heat radiator.

In each of the compressors (32, 42) of the expansion and compression machines (30, 40), the refrigerant is compressed to above its critical pressure. This compressed refrigerant flows through the four-way switching valve (23) into the outdoor heat exchanger (22). In the outdoor heat exchanger (22), the refrigerant gives up heat to the outdoor air.

The flow of the refrigerant which has given up heat in the outdoor heat exchanger (22) is diverged after passage through the first piping line (24a), and enters the expanders (31, 41). In each of the expanders (31, 41), the refrigerant expands and its internal energy is converted into rotation power of each of the compressors (32, 42). And, in each of the expanders (31, 41), the refrigerant of high pressure is decompressed to change state to a gas-liquid two-phase refrigerant.

The refrigerant decompressed in the expander (31) and the refrigerant decompressed in the expander (41) rejoin together and the merged refrigerant flow enters the indoor heat exchanger (21) after passage through the third piping line (24c). In the indoor heat exchanger (21), the refrigerant absorbs heat from the indoor air and is evaporated. At this time, the indoor air cooled by the refrigerant is supplied into the room, whereby cooling of the room is accomplished. The refrigerant evaporated in the indoor heat exchanger (21) flows through the four-way switching valve (23) into the gas-liquid separator (25).

In the gas-liquid separator (25), the refrigerant is separated into a gas refrigerant and a liquid refrigerant. The flow of the gas refrigerant separated by the gas-liquid separator (25) is diverged after passage through the gas introduction pipe (28). Then, the gas refrigerant is drawn into each of the compressors (32, 42). In addition, with control of the degree of opening of the liquid flow rate control valve (29a), the liquid refrigerant separated by the gas-liquid separator (25) is appropriately fed to the liquid introduction pipe (29). And, the refrigerant flowing through the liquid introduction pipe (29) is mixed with the gas refrigerant flowing through the gas introduction pipe (28) to become evaporated, and then drawn into each of the compressors (32, 42).

Heating Operation

Figure 4:
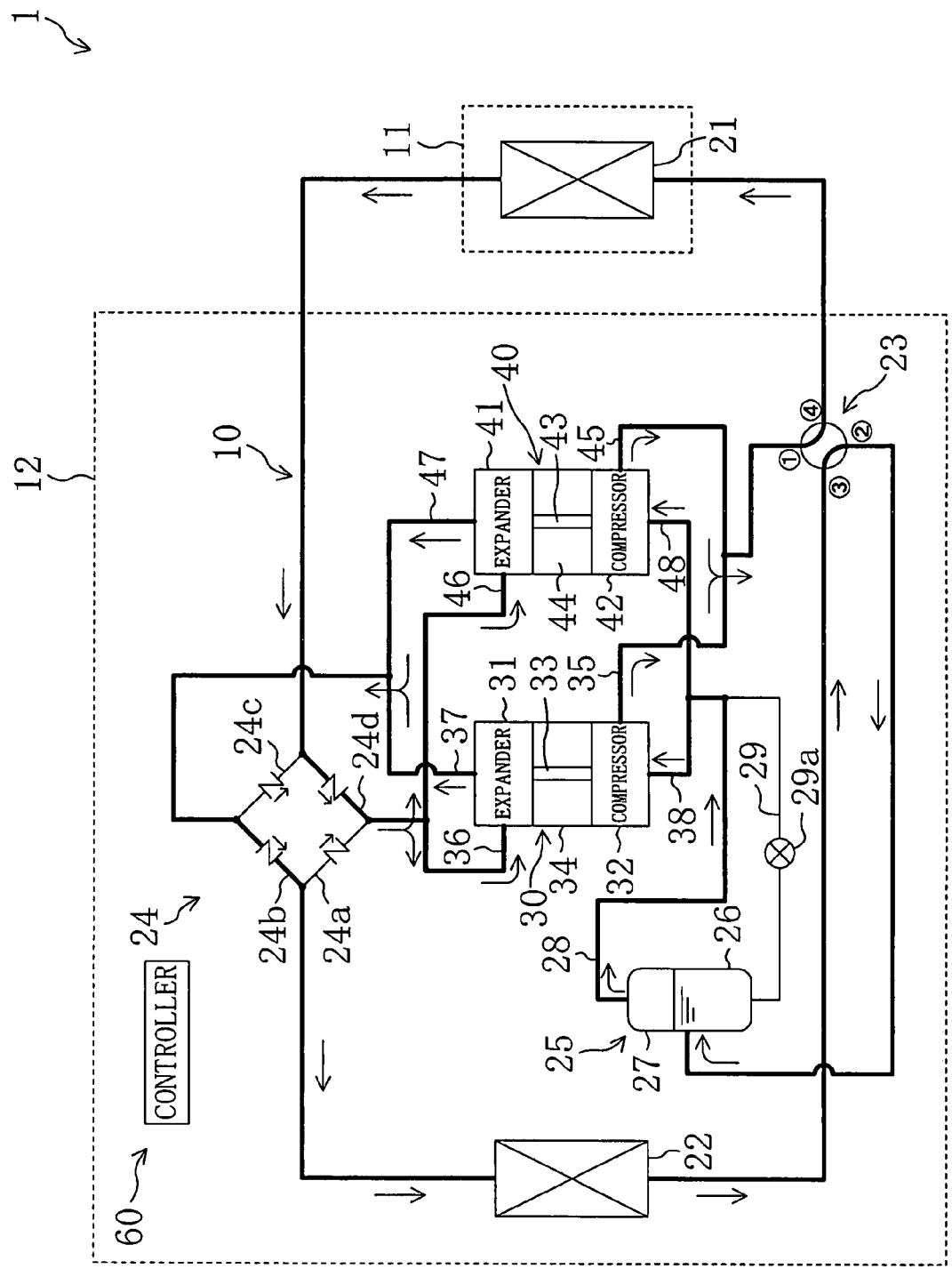
FIG. 4 is a schematic circuit diagram showing the flow of refrigerant during a heating operation of the air conditioner of the first embodiment.

In the heating operation of the air conditioner (1), the four-way switching valve (23) changes state to a state as shown in FIG. 4. In addition, each of the expansion and compression machines (30, 40) is placed in operation whereby the refrigeration cycle is performed as the refrigerant circulates through the refrigerant circuit (10). Consequently, the indoor heat exchanger (21) functions as a heat radiator while on the other hand the outdoor heat exchanger (22) functions as an evaporator.

In each of the compressors (32, 42) of the expansion and compression machines (30, 40), the refrigerant is compressed to above its critical pressure. The compressed refrigerant flows through the four-way switching valve (23) into the indoor heat exchanger (21). In the indoor heat exchanger (21), the refrigerant gives up heat to the indoor air. At this time, the indoor air heated by the refrigerant is supplied to the room whereby heating of the room is accomplished.

The flow of the refrigerant which has given up heat in the indoor heat exchanger (21) is diverged after passage through the fourth piping line (24d), and enters the expanders (31, 41). In each of the expanders (31, 41), the refrigerant expands and its internal energy is converted into rotation power of each of the compressors (32, 42). And, in each of the expanders (31, 41), the refrigerant of high pressure is decompressed to change state to a gas-liquid two-phase refrigerant.

The refrigerant decompressed in the expander (31) and the refrigerant decompressed in the expander (41) rejoin together. Then, the merged refrigerant flow enters the outdoor heat exchanger (22) after passage through the second piping line (24b). In the outdoor heat exchanger (22), the refrigerant absorbs heat from the outdoor air and is evaporated. The refrigerant evaporated in the outdoor heat exchanger (22) flows through the four-way switching valve (23) into the gas-liquid separator (25).

In the gas-liquid separator (25), as in the aforesaid cooling operation, the refrigerant is separated into a gas refrigerant and a liquid refrigerant. The flow of the gas refrigerant separated by the gas-liquid separator (25) is diverged after passage through the gas introduction pipe (28). Then, the gas refrigerant is drawn into each of the compressors (32, 42). In addition, with control of the degree of opening of the liquid flow rate control valve (29a), the liquid refrigerant separated by the gas-liquid separator (25) is appropriately fed to the liquid introduction pipe (29). And, the refrigerant flowing through the liquid introduction pipe (29) is mixed with the gas refrigerant flowing through the gas introduction pipe (28) to become evaporated and then drawn into each of the compressors (32, 42).

Rotation Speed Control of Expansion/Compression Machine

Next, referring to FIG. 2, description will be made regarding the operation of control of the rotation speed of each of the expansion and compression machines (30, 40) when there is variation in the operating condition of the air conditioner (1). In the air conditioner (1), the ratio in rotation speed between the first expansion and compression machine (30) and the second expansion and compression machine (40) is controlled in response to variation in the refrigerant evaporation temperature associated with variation in the outdoor temperature.

In the heating operation of the air conditioner (1), if the outdoor temperature becomes relatively high and, as a result, the evaporation temperature reaches a temperature of about 15° C., this increases the suction refrigerant density dc of each of the compressors (32, 42). Accordingly, the actual density ratio de/dc tends to become smaller relative to the volume ratio Vc/Ve.

Here, under this condition in the air conditioner (1) of the present embodiment, the first expansion and compression machine (30) is operated approximately at a rated rotation speed while on the other hand the rotation speed of the second expansion and compression machine (40) becomes zero, in other words the second expansion and compression machine (40) stops. Consequently, only the first expansion and compression machine (30) having a smaller volume ratio than the second expansion and compression machine (40) is placed in operation, whereby the actual density ratio de/dc and the overall volume ratio Vc/Ve of the air conditioner (1) become approximated. Accordingly, under this operating condition, it is possible to achieve a COP close to the ideal efficiency.

In addition, in the case where the air conditioner (1) is used in cold climates, the outdoor temperature during the heating operation reaches even a temperature of minus 15° C. in some cases. If, under such an operating condition, the evaporation temperature reaches a temperature of about minus 20° C., the suction refrigerant density dc of each of the compressors (32, 42) decreases. Accordingly, the actual density ratio de/dc tends to become greater relative to the volume ratio Vc/Ve.

Here, under this condition in the air conditioner (1) of the present embodiment, the rotation speed of the first expansion and compression machine (30) becomes zero, in other words the first expansion and compression machine (30) stops while on the other hand the second expansion and compression machine (40) is operated approximately at a rated rotation speed. Consequently, only the second expansion and compression machine (40) having a greater volume ratio than the first expansion and compression machine (30) is placed in operation, whereby the actual density ratio de/dc and the overall volume ratio Vc/Ve of the air conditioner (1) become approximated. Accordingly, also under this operating condition, it is possible to achieve a COP close to the ideal efficiency.

Furthermore, if, in the heating operation of the air conditioner (1), the evaporation temperature reaches, for example, a temperature of about minus 2.5° C., this places both the first expansion and compression machine (30) and the second expansion and compression machine (40) in operation. The rotation speed of each of the expansion and compression machines (30, 40) is controlled to be, for example, about 50% of the rated rotation speed. As a result, even under the condition where the evaporation temperature is at about minus 2.5° C., it is possible to achieve a COP close to the ideal efficiency.

In addition, if the evaporation temperature reaches, for example, a temperature of about 10° C., the rotation speed of the first expansion and compression machine (30) is set higher and that of the second expansion and compression machine (40) is set lower, when compared to the condition where the evaporation temperature is at minus 2.5° C. On the contrary, if the evaporation temperature reaches a temperature of about minus 10° C., the rotation speed of the second expansion and compression machine (40) is set higher and that of the first expansion and compression machine (30) is set lower, when compared to the condition where the evaporation temperature is at minus 2.5° C. As described above, in the air conditioner (1) of the present embodiment, the ratio of rotation speed between the expansion and compression machines (30, 40) is appropriately controlled in response to variation in the refrigerant evaporation temperature, thereby constantly achieving a COP close to the ideal efficiency within the range between the design points of the expansion and compression machines (30, 40).

Advantageous Effects of First Embodiment

It is arranged in the first embodiment such that the two expansion and compression machines (30, 40) are connected in parallel to the refrigerant circuit (10). As a result of such arrangement, it becomes possible to expand the range of control of the compressor volume in the air conditioner (1), thereby making it possible to expand the range of performance of the air conditioner (1). This therefore makes it possible to provide air conditioning corresponding to wide variation in the operating condition of the air conditioner (1).

Here, the two expansion and compression machines (30, 40) are designed using different values for the volume ratio Vc/Ve. In other words, the air conditioner (1) is provided with two expansion and compression machines, i.e., the expansion and compression machines (30, 40), having different design points for obtaining ideal COP's. Consequently, in response to variation in the operating condition, only the expansion and compression machine (30) or the expansion and compression machine (40), whichever has a design point close to the operating condition, is placed in operation, thereby making it possible to obtain an ideal COP in the air conditioner (1).

Furthermore, in the operating condition between the two design points, the ratio of rotation speed between the expansion and compression machines (30, 40) is so controlled as to cause the actual density ratio de/dc and the overall volume ratio Vc/Ve of the air conditioner (1) to become approximated. This therefore makes it possible to constantly obtain ideal COP's as long as the operating condition falls within the range between the two design points.

In addition, it is arranged in the first embodiment such that, with respect to the expansion and compression machines (30, 40), the first and second compressor (32, 42) have the same value for the suction volume Vc. As a result of such arrangement, it becomes possible for the compressors (32, 42) to have the same specification, thereby making it possible to effectively cut down the costs of the expansion and compression machines (30, 40).

Further, in the first embodiment, the gas-liquid separator (25) is disposed on the suction side of the compressors (32, 42). And, it is arranged such that the liquid refrigerant separated by the gas-liquid separator (25) is fed to the suction side of each of the compressors (32, 42) in response to control of the degree of opening of the liquid flow rate control valve (29a). As a result of such arrangement, it becomes possible to control the overall amount of refrigerant circulation in the refrigerant circuit (10), thereby making it possible for the air conditioner (1) to perform an optimal operation in response to the operating condition.

Variations of First Embodiment

In the following, description will be made regarding variations of the first embodiment with reference to the drawings. Now, the difference from the first embodiment is explained below.

First Variation

Figure 5:
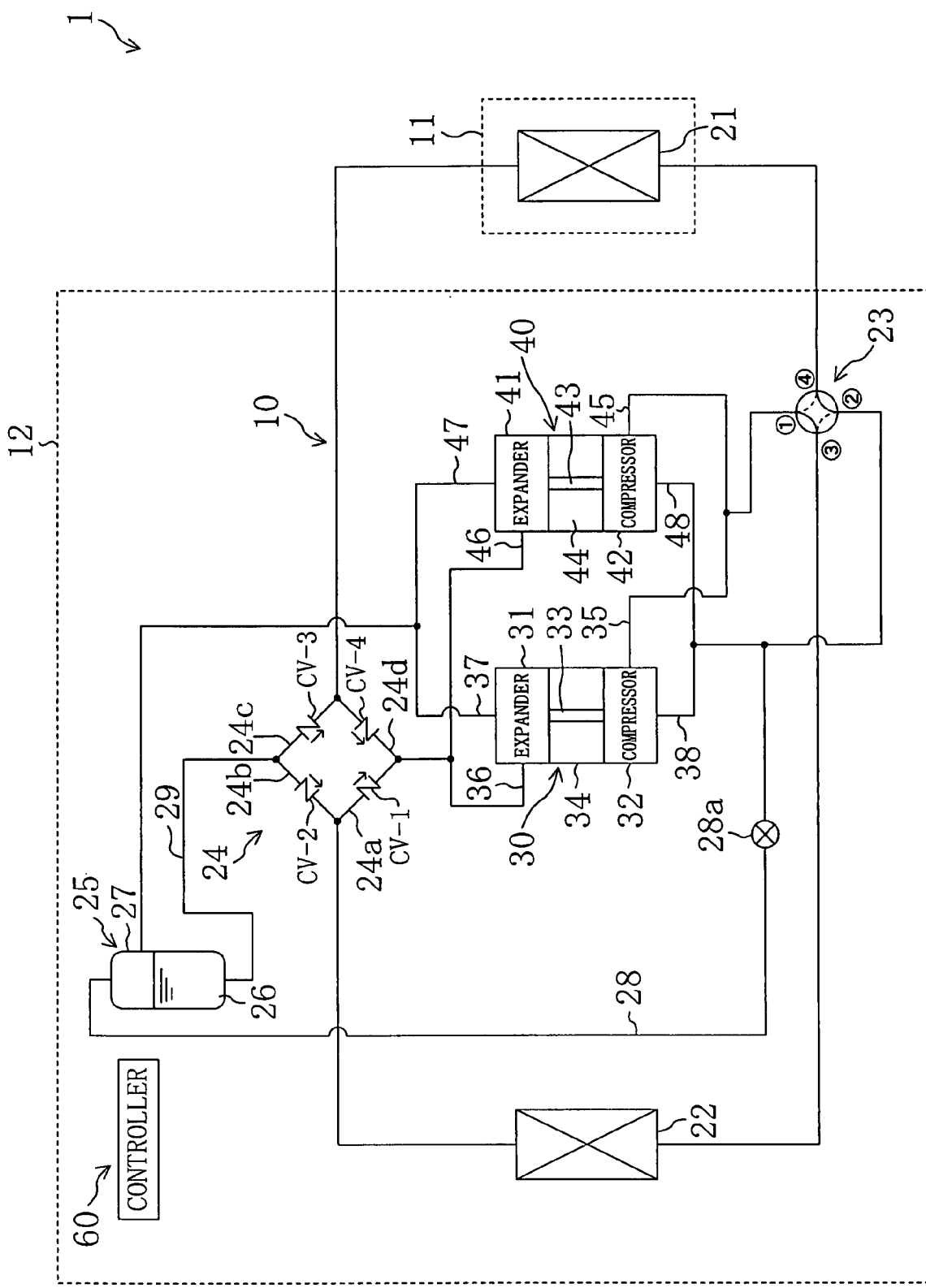
FIG. 5 is a schematic circuit diagram of an air conditioner according to a first variation of the first embodiment.

The air conditioner (1) shown in FIG. 5 differs from its counterpart in the first embodiment, in other words, the gas-liquid separator (25) of the first variation is differently located in the refrigerant circuit (10) from the first embodiment. More specifically, the gas-liquid separator (25) of the first embodiment is disposed on the suction side of the compressors (32, 42) while on the other hand the gas-liquid separator (25) of the first variation is disposed on the outflow side of the expanders (31, 41). In addition, the second port of the four-way switching valve (23) is connected through a branch pipe to the suction pipes (38, 48) of the compressors (32, 42).

One end of the liquid introduction pipe (29) is connected to the liquid storage part (26) of the gas-liquid separator (25). The other end of the liquid introduction pipe (29) is connected to the inflow sides of the second and third piping lines (24b, 24c) of the bridge circuit (24). On the other hand, one end of the gas introduction pipe (28) is connected to the gas storage part (27) of the gas-liquid separator (25). The other end of the gas introduction pipe (28) is connected to a piping line between the second port of the four-way switching valve (23) and a branch pipe on the suction side of the compressors (32, 42). In addition, the gas introduction pipe (28) is provided with a gas flow rate control valve (28a) capable of control of the degree of opening of the gas introduction pipe (28).

Also in the first variation, the two expansion and compression machines (30, 40) differing from each other in volume ratio are connected to the refrigerant circuit (10), as in the first embodiment. As a result of such arrangement, it becomes possible to expand the range of control of the compressor volume in the air conditioner (1) and, in addition, it becomes possible to obtain an ideal COP by controlling the ratio of rotational speed between the expansion and compression machines (30, 40) in response to the operating condition.

In addition, in the first variation, the gas-liquid two-phase refrigerant after expansion in each of the expanders (31, 41) flows into the gas-liquid separator (25). This therefore ensures separation of the gas-liquid two-phase refrigerant into a gas refrigerant and a liquid refrigerant in the gas-liquid separator (25). As a result of such arrangement, it becomes possible to feed the liquid refrigerant after separation in the gas-liquid separator (25) to the indoor heat exchanger (21) through the third piping line (24c), for example, during the cooling operation. Consequently, the amount of heat adsorption of the air with respect to the indoor air can be increased, when compared to the case where the gas-liquid two-phase refrigerant is fed to the indoor heat exchanger (21), and the capability of cooling by the indoor heat exchanger (21) can be enhanced. Furthermore, the gas refrigerant after separation in the gas-liquid separator (25) can be appropriately drawn into each of the compressors (32, 42) by controlling the degree of opening of the gas control valve (28a). Accordingly, it becomes possible to control the overall amount of refrigerant circulation in the refrigerant circuit (10), as in the first embodiment.

Second Variation

Figure 6:
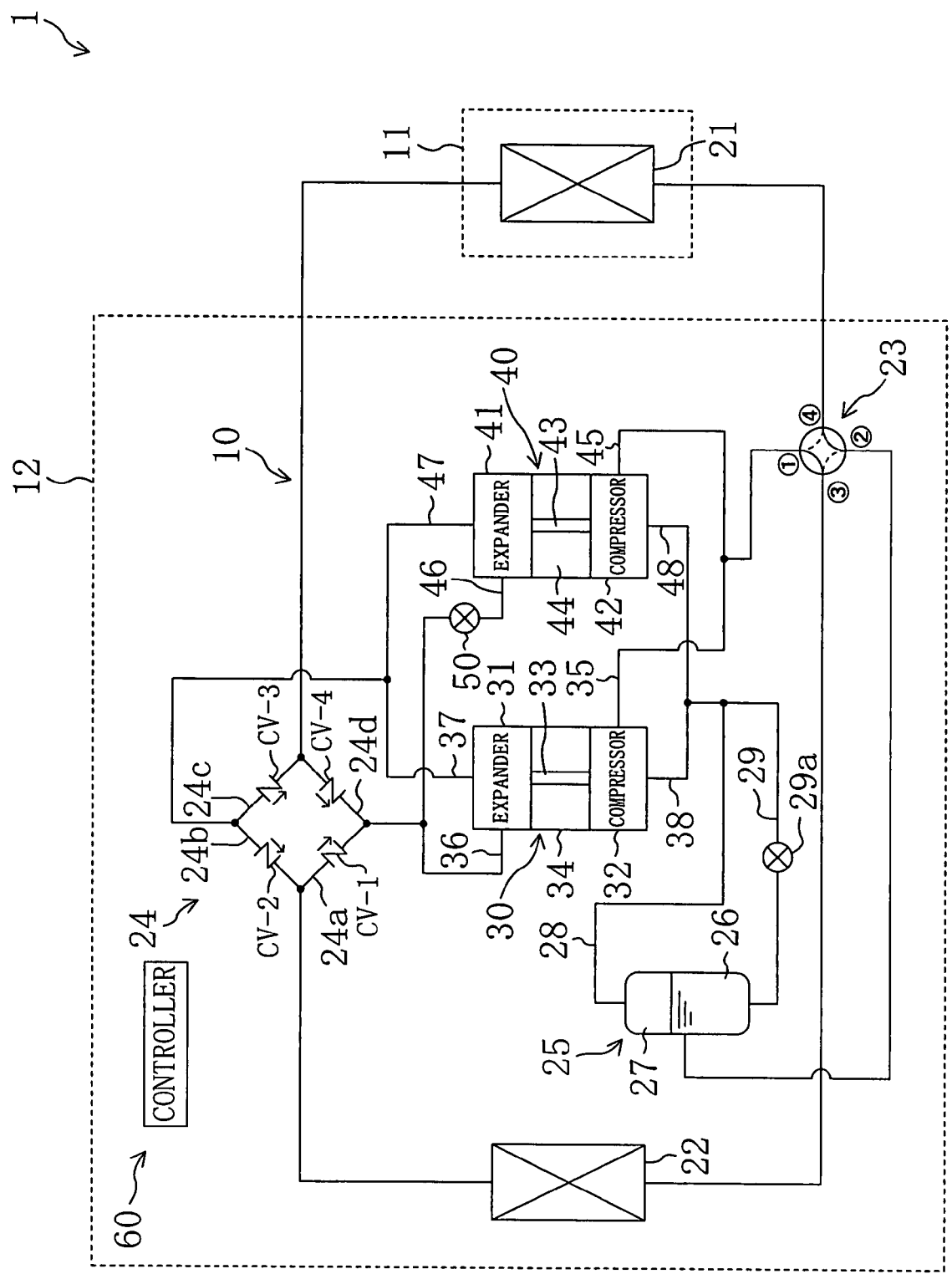
FIG. 6 is a schematic circuit diagram of an air conditioner according to a second variation of the first embodiment.

Unlike the first embodiment, the air conditioner (1) of the second variation shown in FIG. 6 is provided, in the refrigerant circuit (10), with a pre-expansion valve (50). In the second variation, the pre-expansion valve (50) is disposed on the inflow side of the second expander (41) of the second expansion and compression machine (40) having a greater volume ratio than the first expansion and compression machine (30). The pre-expansion valve (50) is implemented, for example, by an electronic expansion valve and its degree of opening is appropriately controlled by the controller (60).

For example, if the evaporation temperature (FIG. 2) falls below the design temperature of the second expansion and compression machine (40) and the actual density ratio de/dc exceeds the volume ratio Vc/Ve even when only the second expansion and compression machine (40) is placed in operation, the degree of opening of the pre-expansion valve (50) is reduced in this second variation. As a result, it becomes possible to reduce the inflow refrigerant density de of the expander (41), thereby making it possible for the density ratio de/dc to approximate to the volume ratio Vc/Ve.

Third Variation

Figure 7:
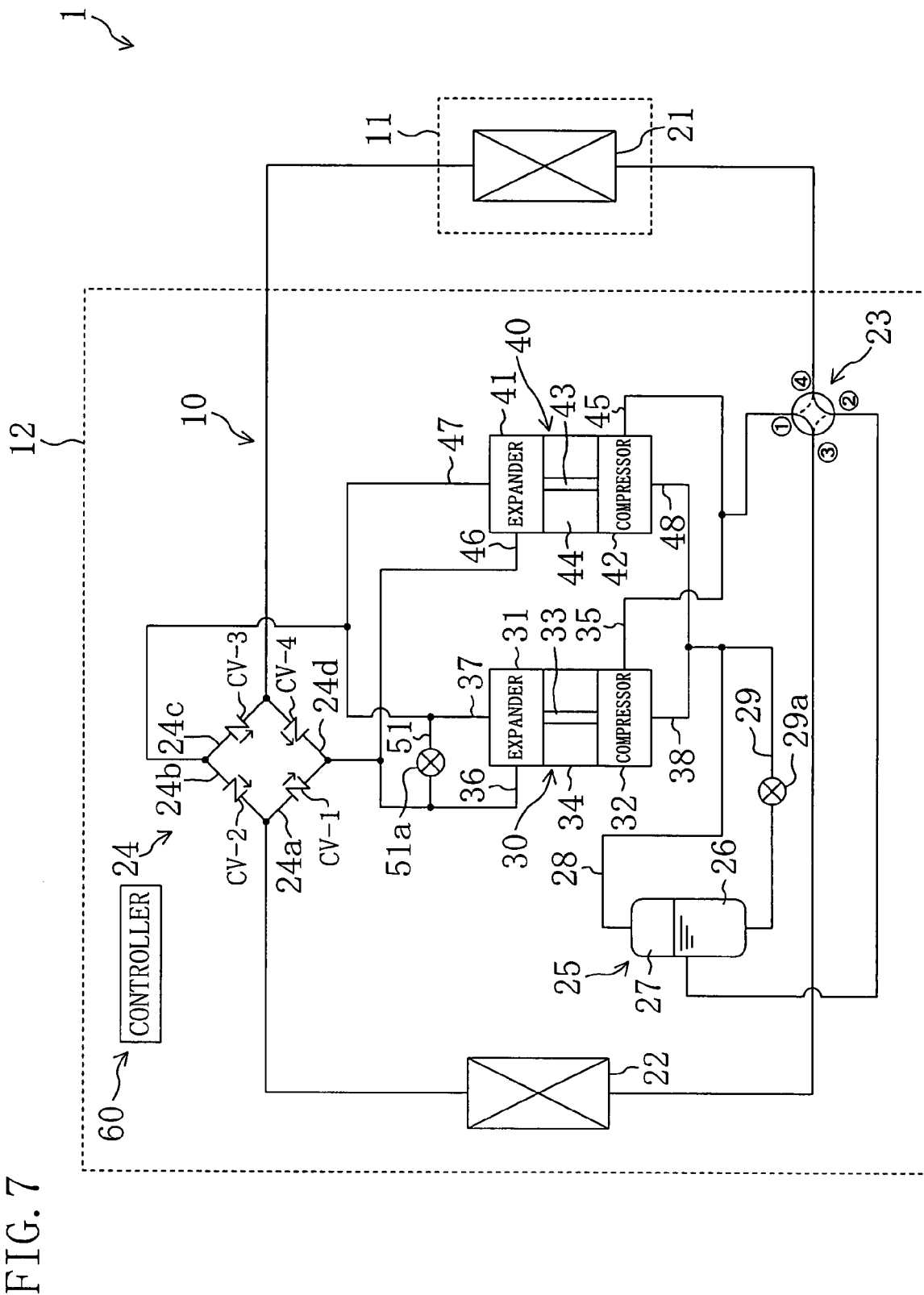
FIG. 7 is a schematic circuit diagram of an air conditioner according to a third variation of the first embodiment.

Unlike the first embodiment, the air conditioner (1) of the third embodiment shown in FIG. 7 is provided, in the refrigerant circuit (10), with a bypass pipe (51). One end of the bypass pipe (51) is connected to the inflow side of the first expander (31) of the first expansion and compression machine (30) while the other end thereof is connected to the outflow side of the first expander (31). The bypass pipe (51) is provided with a bypass valve (51a). The degree of opening of the bypass valve (51a) is appropriately controlled by the controller (60).

In the third variation, for example, if the evaporation temperature (FIG. 2) becomes higher than the design temperature of the first expansion and compression machine (30) and the actual density ratio de/dc falls below the volume ratio Vc/Ve even when only the first expansion and compression machine (30) is placed in operation, the bypass valve (51a) is opened. As a result, it becomes possible to allow the inflow refrigerant unprocessable by the expander to be bypassed to the outflow side of the expander.

Note that, although the bypass pipe (51) and the bypass valve (51a) are disposed on the inflow side of the first expander (31) in this variation, the same operation/working-effect can be obtained even when they are disposed on the inflow side of the second expander (41). In addition, in combination with the pre-expansion valve (50) of the second variation, the bypass pipe (51) and the bypass valve (51a) may be disposed in the refrigerant circuit (10).

Second Embodiment of the Invention

Figure 8:
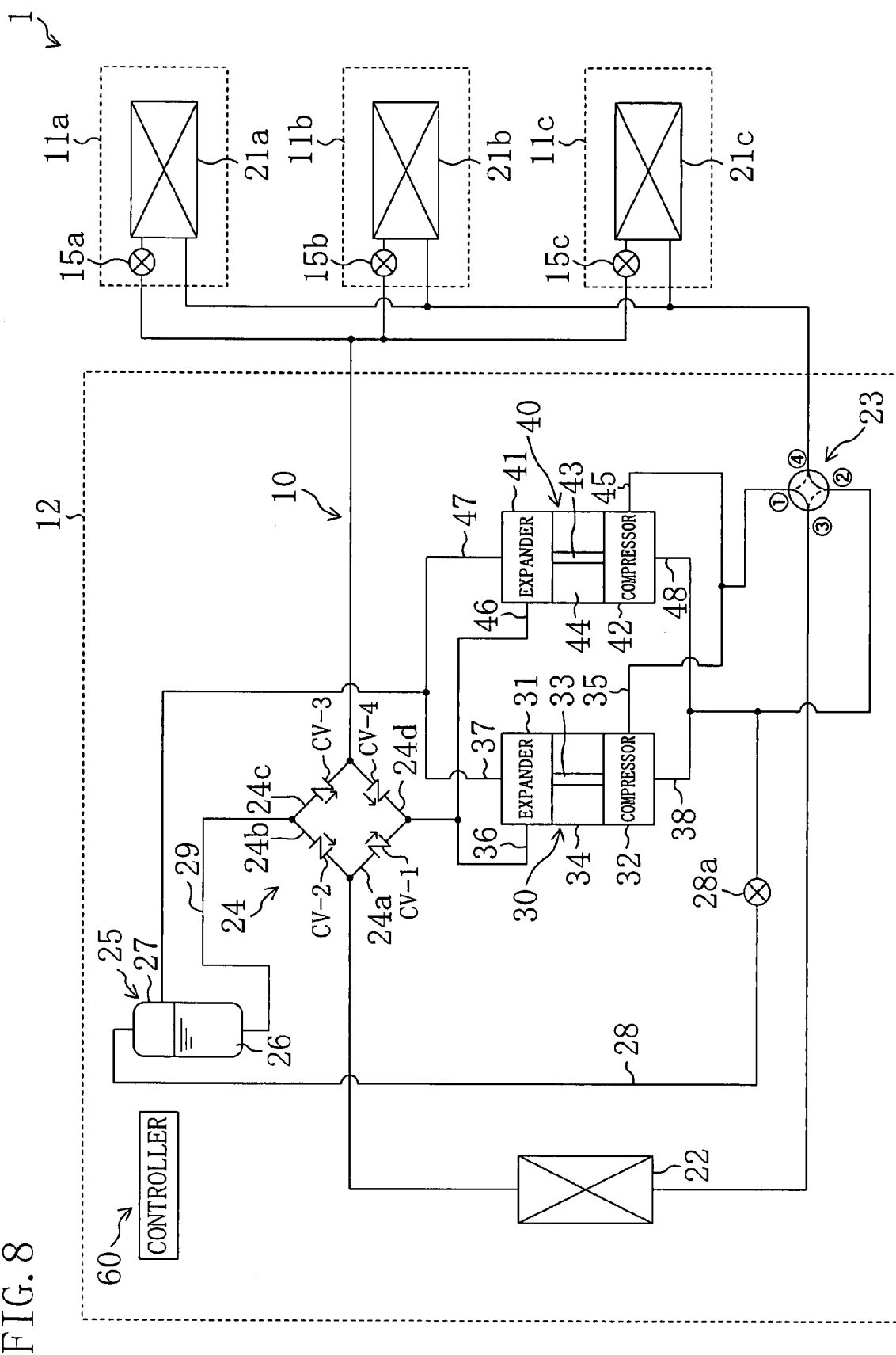
FIG. 8 is a schematic circuit diagram of an air conditioner according to a second embodiment of the present invention.
Figure 9:
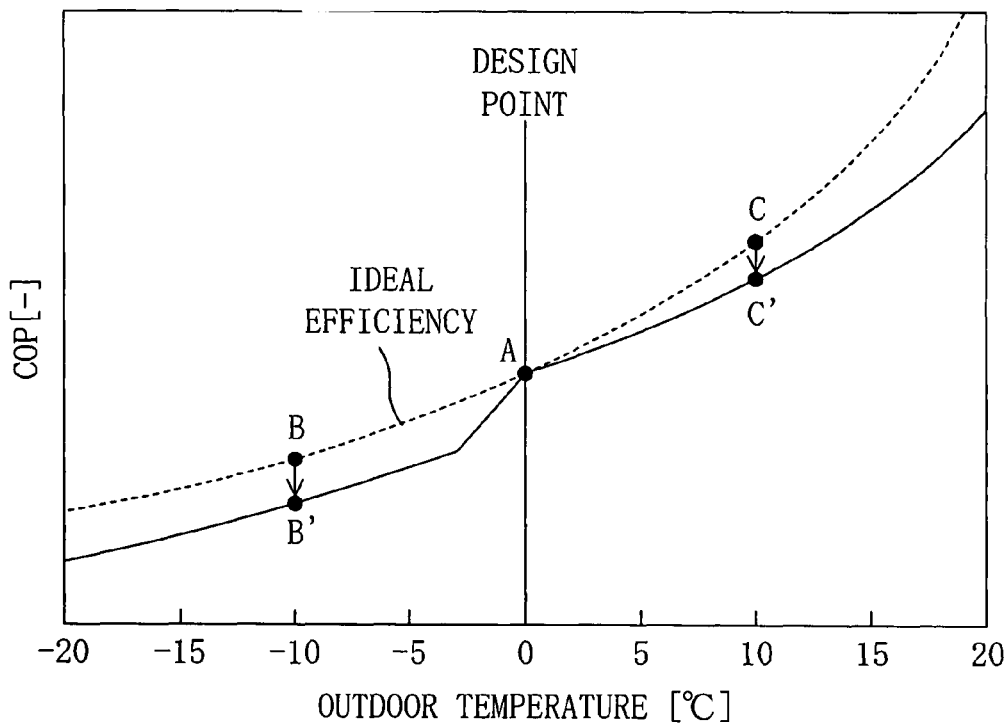
FIG. 9 is a diagram graphically showing a relationship between the outdoor temperature and the COP in a conventional refrigeration apparatus.
Figure 10:
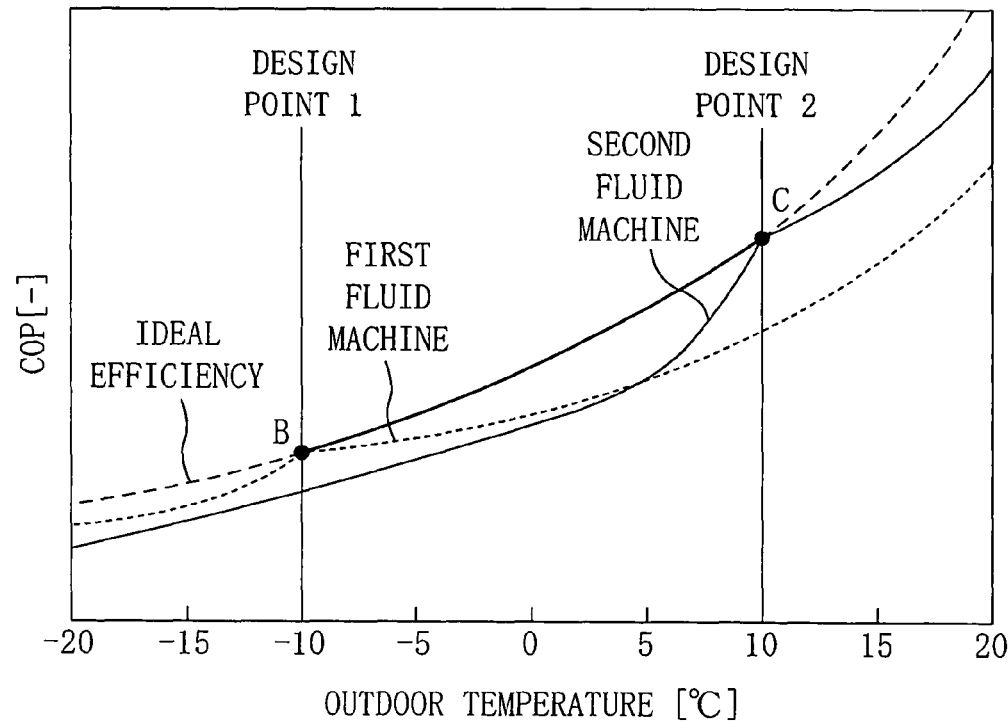
FIG. 10 is a diagram graphically showing a relationship between the outdoor temperature and the COP in a refrigeration apparatus of the present invention.

Next, description will be made regarding a refrigeration apparatus according to a second embodiment of the present invention. As shown in FIG. 8, the refrigeration apparatus of the second embodiment is applied to a so-called multi-type air conditioner (1) having a plurality of indoor units.

The air conditioner (1) of the second embodiment is provided with an outdoor unit (12) of the same type as the second variation of the first embodiment. On the other hand, in the air conditioner (1), a first to a third indoor unit (11a, 11b, 11c) are connected in parallel with respect to the outdoor unit (12) and each of the indoor units (11a, 11b, 11c) is installed in a respective different indoor space.

The indoor units (11a, 11b, 11c) are provided with a first to a third indoor heat exchanger (21a, 21b, 21c), respectively. In addition, the indoor heat exchangers (21a, 21b, 21c) are provided, on their refrigerant inflow side, with a first to a third flow rate control valve (15a, 15b, 15c) corresponding to the indoor heat exchangers (21a, 21b, 21c), respectively. Accordingly, the amount of refrigerant flowing into each of the indoor heat exchangers (21a, 21b, 21c) is individually controllable by its associated one of the flow rate control valves (15a, 15b, 15c).

As stated above, if the air conditioner (1) is of the indoor multi-type, this requires a wider control range of the compressor volume as compared, for example, to the first embodiment. Contrary to this, in the present embodiment, because of provision of the plural expansion and compression machines (30, 40) in the refrigerant circuit (10), it becomes possible to expand the range of control of the volume of each of the compressors (32, 42). This therefore makes it possible to control the capability of the air conditioner (1), following the operating condition of each of the indoor units (11a, 11b, 11c).

In addition, also in the second embodiment, the two expansion and compression machines (30, 40) differing from each other in volume ratio are disposed in the refrigerant circuit (10), thereby making it possible to obtain an ideal COP by controlling the ratio of rotational speed between the expansion and compression machines (30, 40) in response to the operating condition.

Other Embodiments of the Invention

The foregoing embodiments may be configured in the following ways.

In the foregoing embodiments, the volume ratio of the first expansion and compression machine (30) is set at 4.0 while the volume ratio of the second expansion and compression machine (40) is set at 20. However, these values set for the volume ratio should not be deemed limitative. More specifically, of the plural expansion and compression machines, one whose volume ratio is the smallest preferably has a volume ratio not less than 2 nor more than 6 (more preferably not less than 3 nor more than 4). On the other hand, of the plural expansion and compression machines, another one whose volume ratio is the greatest preferably has a volume ratio not less than 10 nor more than 30 (more preferably not less than 15 nor more than 20).

In addition, in the foregoing embodiments, with respect to the expansion and compression machines (30, 40), the first expander (31) and the second expander (41) are set at different values for the inflow volume Ve while on the other hand these expanders (31, 41) are set at the same value for the suction volume Vc. However, as long as the volume ratio of each of the expansion and compression machines (30, 40) is so designed as to differ from that of the other, the expanders (31, 41) may have any values for the inflow volume Ve and the compressors (32, 42) may have any values for the suction volume Vc.

More specifically, for example, it may be arranged in the expansion and compression machines (30, 40) of the first embodiment such that the suction volume $Vc_2$ of the second compressor (42) is made greater than the suction volume $Vc_1$ of the first compressor (32) while on the other hand the first expander (31) and the second expander (41) have the same value for the inflow volume Ve. As a result of such arrangement, the compressor volume can be taken large under the condition where the outdoor temperature (evaporation temperature) falls during the heating operation in winter and only the second expansion and compression machine (40) is placed in operation. Consequently, during the heating operation in which the indoor sensible heat load increases, it becomes possible to improve the capability of heating by the air conditioner (1).

In addition, in the foregoing embodiments, the refrigerant circuit (10) is provided with the two expansion and compression machines (30, 40) having different volume ratios. Alternatively, it may be arranged such that the refrigerant circuit (10) is provided with three or more expansion and compression machines having different volume ratios. In addition, in addition to the two expansion and compression machines (30, 40), a compressor having only a compression mechanism may be provided. Also note that this compressor may be formed by a compressor whose rotation speed can be variably controlled or is constant.

Furthermore, the expansion and compression machines (30, 40) of the foregoing embodiments are formed by positive displacement fluid machines having respective inherent cylinder volumes. However, instead of employing the expanders (31, 41) of the expansion and compression machines (30, 40), expanders whose cylinder volume is variable may be applied. For example, such a volume variable type of expander is configured such that an auxiliary chamber in fluid communication with a cylinder chamber of the expander is formed and the volume of the auxiliary chamber can be increased/decreased by operation of the piston or the like. If, in this way, volume variable type expanders are applied to the expansion and compression machines (30, 40) of the foregoing embodiments, this makes it possible to change the volume ratio itself of each of the expansion and compression machines (30, 40) in response to the operating condition, thereby making it possible to change the capability of the air conditioner in response to wider variation in the operating condition.

It should be noted that the above-descried embodiments are essentially preferable exemplifications which are not intended in any sense to limit the scope of the present invention, its application, or its application range.

INDUSTRIAL APPLICABILITY

As has been described above, the present invention finds its utility in the field of refrigeration apparatuses having a fluid machine which is configured by coupling together an expander and a compressor.

What is claimed is:

1. A refrigeration apparatus comprising a refrigerant circuit in which a refrigeration cycle is performed by circulation of refrigerant therethrough and a fluid machine connected to the refrigerant circuit, the fluid machine including an expander, a compressor, and a rotation shaft for coupling together the expander and the compressor;
wherein a plurality of the fluid machines are connected to the refrigerant circuit;
wherein the expanders of the fluid machines are mutually connected in parallel; and
wherein the compressors of the fluid machines are also mutually connected in parallel,
wherein, where the suction volume of refrigerant drawn into the compressor per one rotation of the rotation shaft of each of the plurality of the fluid machines is expressed by Vc and the inflow volume of refrigerant flowing into the expander per one rotation of the rotation shaft of each of the plurality of the fluid machines is expressed by Ve, the plurality of the fluid machines are configured such that they differ from each other in the volume ratio, Vc/Ve, of the suction volume Vc to the inflow volume Ve.

2. The refrigeration apparatus of claim 1, further comprising:
a controller which provides individual control of the rotation speed of each of the rotation shafts of the plurality of the fluid machines.

3. The refrigeration apparatus of claim 1,
wherein the plurality of the fluid machines are configured such that they have the same value for the suction volume Vc.

4. The refrigeration apparatus of claim 1,
wherein the refrigerant circuit is provided with an expansion valve which is disposed on the inflow side of the expander of only one of the plural fluid machines that has the largest value for the volume ratio Vc/Ve thereamong.

5. The refrigeration apparatus of any one of claims 1-4, wherein the refrigerant in the refrigerant circuit is $CO_2$.

6. The refrigeration apparatus of claim 2, further comprising:
a temperature sensor sensing at least one of an outdoor temperature and refrigerant evaporation temperature, wherein
the controller controls the rotation speed based on the sensed temperature.

7. The refrigeration apparatus of claim 2, further comprising:
a pressure sensor configured to measure a high pressure and a low pressure of the refrigerant.

8. The refrigeration apparatus of claim 6, wherein
the controller controls a first fluid machine of the plurality of fluid machines to operate at a first rotation speed while controlling all others of the plurality of fluid machines to stop when the sensed temperature is at a first design point,
the controller controls a second fluid machine of the plurality of fluid machines to operate at a second rotation speed while controlling all others of the plurality of fluid machines to stop when the sensed temperature is at a second design point, and
the controller controls the first fluid machine and the second fluid machine to operate at a third rotation speed and a fourth rotation speed, respectively, when the sensed temperature is between the first design point and the second design point.

9. The refrigeration apparatus of claim 1, wherein
the inflow volume of each expander of the plurality of the fluid machines is different than all other expanders.

10. The refrigeration apparatus of claim 9, wherein
the inflow volume of a first expander is 5 cc, and
the inflow volume of a second expander is 1.33 cc.

11. The refrigeration apparatus of claim 9, wherein
the suction volume of each compressor of the plurality of fluid machines is 20 cc.

12. The refrigeration apparatus of claim 1, wherein
a first fluid machine of the plurality of fluid machines satisfies Vc/Ve=de1/dc1, where de1 is expander inflow refrigerant density at a first operating condition, and dc1 is compressor suction refrigerant density at the first operating condition, and
a second fluid machine of the plurality of fluid machines satisfies Vc/Ve=de2/dc2, where de2 is expander inflow refrigerant density at a second operating condition, and dc2 is compressor suction refrigerant density at the second operating condition.

13. The refrigeration apparatus of claim 12, wherein
the first fluid machine of the plurality of fluid machines has a ratio of Vc/Ve equal to 20, and the second fluid machine of the plurality of fluid machines has a ratio of Vc/Ve equal to 4.

14. The refrigeration apparatus of claim 1, further comprising:
a controller which controls a ratio of rotation speed between the plurality of the fluid machines in response to an operating condition when the plurality of the fluid machines are simultaneously operated.

* * * * *